Oct. 29, 1968  F. A. DOBSON  3,408,621
SUBMARINE TRACKING APPARATUS
Filed Feb. 14, 1961  3 Sheets-Sheet 1
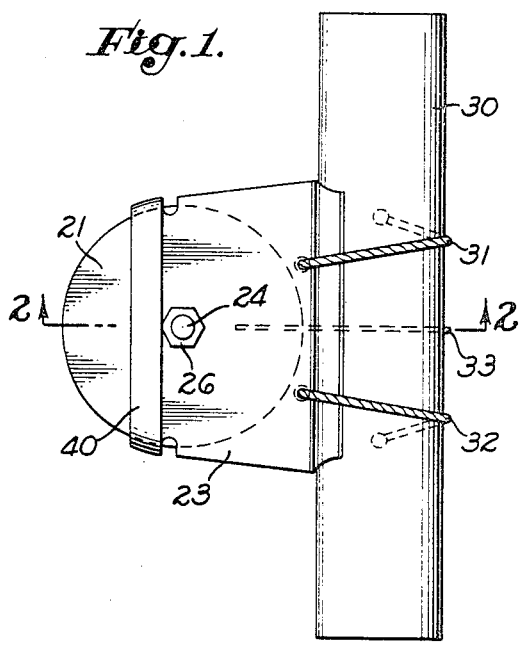
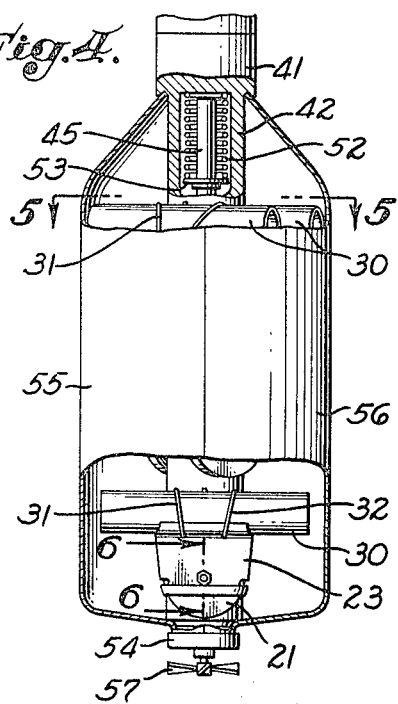
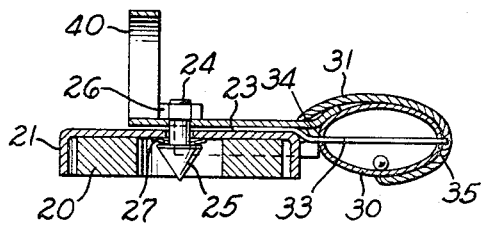
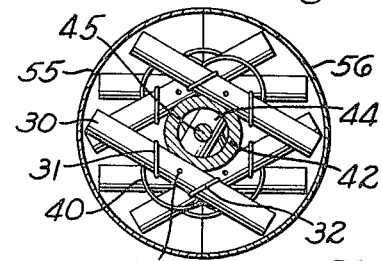
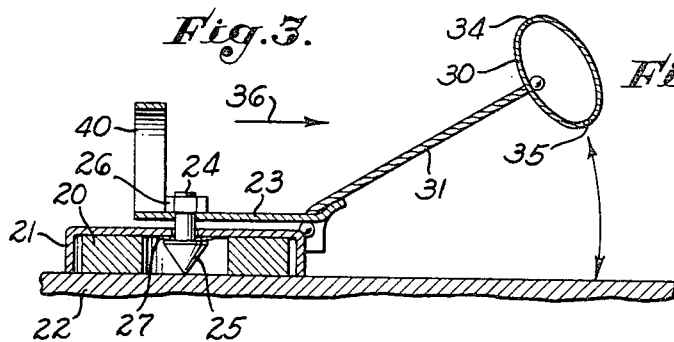
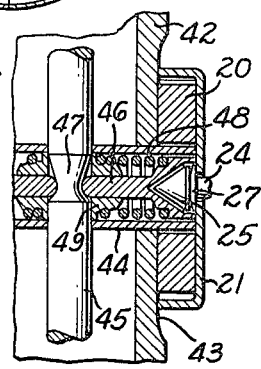
INVENTOR.
FRANKLIN A. DOBSON
BY HIS ATTORNEYS.
HARRIS, KIECH, RUSSELL & KERN

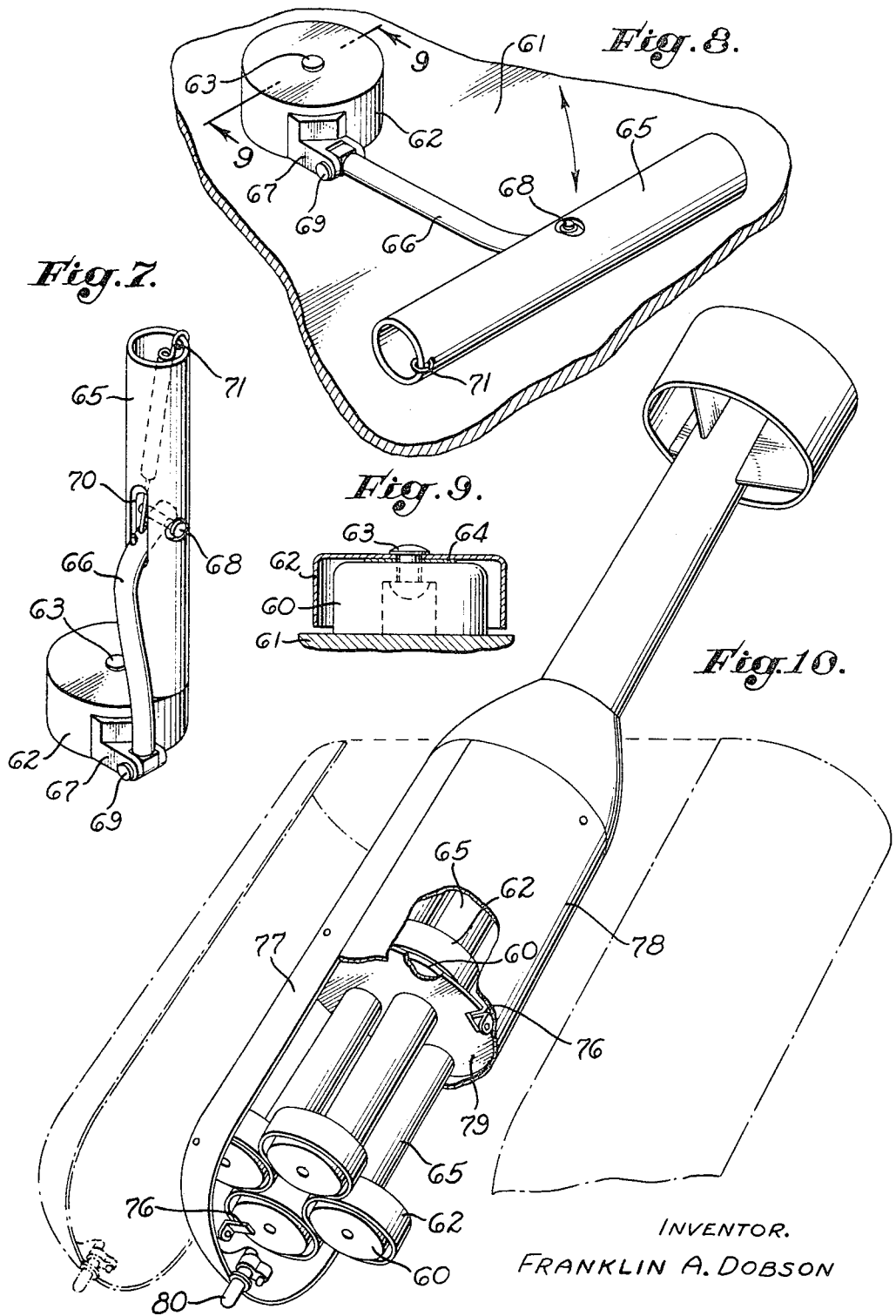

Oct. 29, 1968   F. A. DOBSON   3,408,621
SUBMARINE TRACKING APPARATUS
Filed Feb. 14, 1961   3 Sheets-Sheet 3
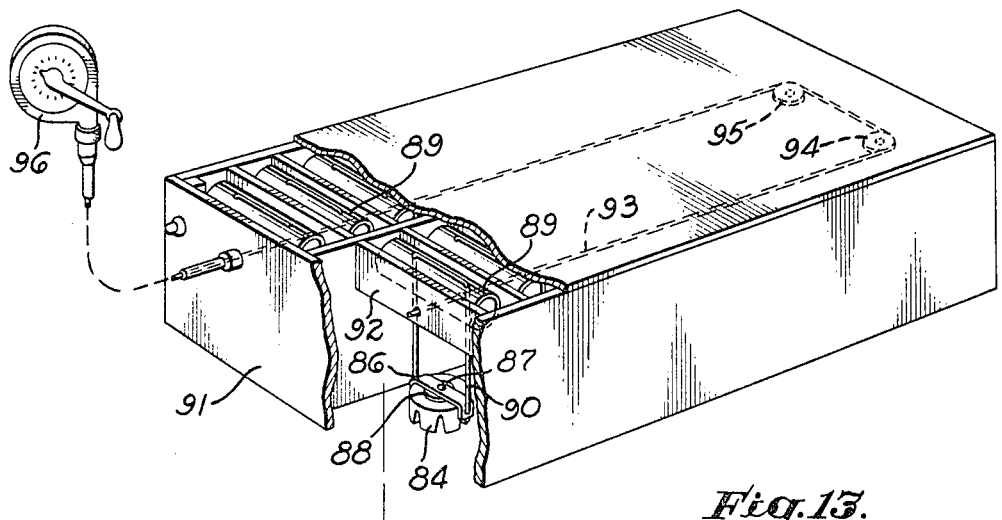
Fig.11.
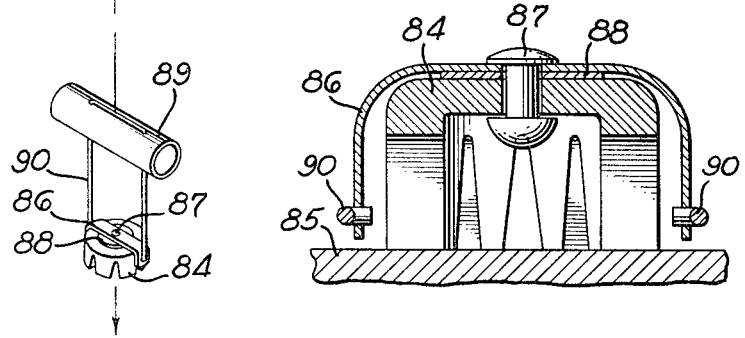
Fig.13.
Fig.12.
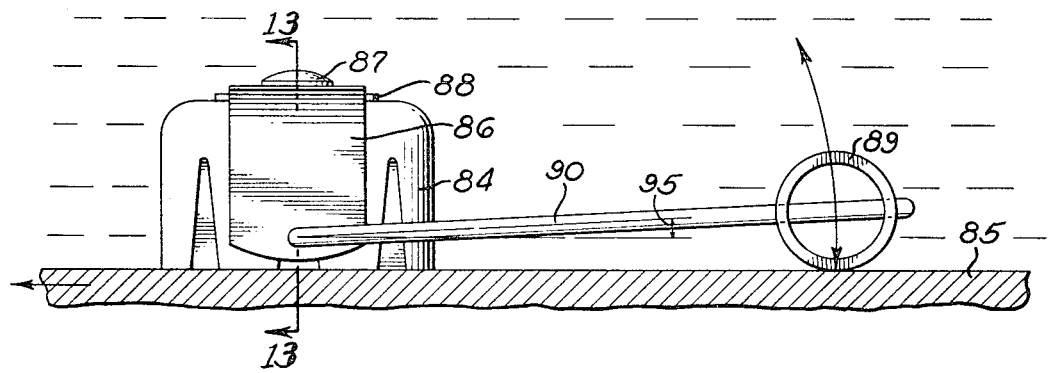
INVENTOR.
FRANKLIN A. DOBSON
BY HIS ATTORNEYS.
HARRIS, KIECH, RUSSELL & KERN United States Patent Office 3,408,621
Patented Oct. 29, 1968

3,408,621
SUBMARINE TRACKING APPARATUS
Franklin A. Dobson, Corona Del Mar, Calif., assignor, by mesne assignments, to Philco-Ford Corporation, Philadelphia, Pa., a corporation of Delaware
Filed Feb. 14, 1961, Ser. No. 89,581
19 Claims. (Cl. 340—5)

ABSTRACT OF THE DISCLOSURE

A hydrodynamic oscillating unit for generating underwater sound waves is described. The unit includes a magnet for attachment to the hull of a submarine, and the sound is generated by an oscillating rod which hammers against the hull due to hydrodynamic forces resulting from the movement of the submarine through the water. In practice several of said units are dropped in the vicinity of a target submarine and after attachment of one of the units to the submarine hull, the sound generated by the unit is used to track the submarine by conventional sonar apparatus.

---

This invention relates to ships and the like, especially submarines and, in particular, to new and improved apparatus and methods for tracking ships in the water. The invention will be discussed herein in conjunction with tracking of submarines but is equally applicable to other types of vessels.

The most important aspect of defense against submarines is detection of the vessel and various systems for this purpose are in use. Once a contact is made, the problems of classifying the contact and of continuing to track the vessel through evasive maneuvers become significant. It is an object of the present invention to provide a hydrodynamically actuated mechanical oscillator adapted for attaching to a submarine to provide sound signals for reception by conventional sonar equipments. A further object is to provide such apparatus which will produce signals representative of the velocity of the submarine, particularly at low speeds, for combination with the position signals provided by the conventional sonar equipment to give an improved indication of the direction of travel of the submarine.

It is an object of the invention to provide a hydrodynamic oscillator unit for use in tracking submarines, which unit can be dispersed together with a large number of similar units from a surface vessel or aircraft rapidly and over a large area for attachment to a submarine after the submarine has been located or after a sonar contact has been made. Another object is to provide such units which are small, inexpensive, and easily stored. A further object is to provide such units which will operate over a wide range of submarine speeds, which require little or no maintenance and no checkout or preparation prior to use.

It is a specific object of the invention to provide an apparatus for tracking submarines or the like including attaching means for attaching the apparatus to a hull at an attaching surface, a rod, and coupling means for connecting the rod to the attaching means with the rod movable toward and away from the hull in an oscillatory motion as a function of the movement of the apparatus through the water. A specific object is to provide such an apparatus wherein the attaching means is a magnet which adheres the apparatus to the hull. Another object is to provide such an apparatus wherein the rod is a metal tube carried on a flexible suspension from the magnet permitting the rod to hammer against the hull.

It is an object of the invention to provide an apparatus for tracking a submarine including hull attaching means and hammering means with the hull attaching and hammering means assembled in a compact configuration for falling through the water. A further object is to provide such a structure wherein the configuration is changed upon attachment of the unit to the hull permitting the hammering means to oscillate relative to the attaching means.

It is an object of the invention to provide a new method for tracking submarines comprising attaching an oscillatory hydrodynamic hammer to the submarine hull and detecting the sounds produced by the hammer to provide a measure of the velocity of the submarine as well as a measure of its direction.

The invention also comprises novel details of construction and novel combinations and arrangements of parts, which will more fully appear in the course of the following description. The drawings merely show and the description merely describes preferred embodiments of the present invention which are given by way of illustration or example.

In the drawings:

FIG. 1 is a top plan view of a preferred form of the invention;

FIG. 2 is a sectional view taken along the line 2—2 of FIG. 1;

FIG. 3 is a sectional view showing the unit of FIGS. 1 and 2 in operation;

FIG. 4 is a partial sectional view showing a projectile for delivering the unit of FIG. 1;

FIG. 5 is a sectional view taken along the line 5—5 of FIG. 4;

FIG. 6 is an enlarged sectional view taken along the line 6—6 of FIG. 4;

FIG. 7 is an isometric view of an alternative form of the invention;

FIG. 8 is a view showing the unit of FIG. 7 installed;

FIG. 9 is a sectional view taken along the line 9—9 of FIG. 8;

FIG. 10 illustrates a projectile suitable for dispersing the unit of FIG. 7;

FIG. 11 is a view showing a dispersing apparatus for another form of the invention;

FIG. 12 is an enlarged view showing one of the units of FIG. 11 installed; and

FIG. 13 is a sectional view taken along the line 13—13 of FIG. 12.

The preferred embodiment shown in FIGS. 1, 2 and 3 includes a magnet 20 mounted in a case 21 with the magnet functioning as the means for attaching the apparatus to the submarine hull 22. A plate member 23 is mounted to the case 21 by a shaft 24 having a pointed head 25 and a nut 26. A spring washer 27 is positioned on the shaft 24 between the head 25 and the case 21 for urging the plate member 23 toward the case 21, as seen in FIG. 2.

A hammering element in the form of a tubular rod 30 is coupled to the member 23 by cables 31, 32. The rod 30 is shown in the stored position in FIGS. 1 and 2 and in the operating position in FIG. 3.

Referring first to the stored position, a pin 33 is passed through aligned openings 34, 35 in the rod and is clamped between the plate member 23 and the case 21 by the action of the spring 27. This pin maintains the rod in engagement with the plate member, as best seen in FIG. 2, and the cables 31, 32 are dimensioned so that very little slack exists when the rod is in the stored position.

When the magnet 20 engages the hull 22 attaching the unit thereto, the head 25 of the shaft 24 also engages the hull and compresses the spring 27. This compression permits the plate member 23 to move away from the case 21, releasing the pin 33 and permitting the rod to move to the position shown in FIG. 3. The unit is now ready for generating sound signals.

When the submarine with the unit attached thereto moves through the water, the plate member 23 will pivot on the shaft 24 positioning the rod downstream. The arrow 36 of FIG. 3 illustrates the direction of movement of the water. As the submarine moves through the water the rod will be oscillated toward and away from the hull due to hydrodynamic forces acting on the rod. This oscillatory motion will result in hammering of the rod on the hull producing the desired sound signals. The frequency of oscillation of the rod (the hammering rate) varies with the speed of the submarine in the water since the hydrodynamic drag force acting on the rod is a function of velocity of fluid moving past the rod. In general, a larger diameter rod will have a lower minimum operating speed. The frequency of the sound produced by the hammering (the tone) is relatively independent of speed and permits identification of the device by sonar listening equipment. The rod may be designed to produce a particular tone for specific applications, but ordinarily a broad spectrum of sound is desired so that the hammering can be heard by different types of equipment and in the presence of various background noises.

The rod 30 is shown herein as an open tube of elliptical cross section. A closed tube or solid bar could be used; tubes are preferred for weight saving and economy reasons and appear to operate better at low speeds. The rod should be formed of a material suitable for hammering and steel is preferred. The shape of the rod and the arrangement of the elements of the apparatus are selected to meet conflicting requirements. The apparatus should have good sinking and attaching characteristics, i.e., the units should fall rapidly and straight down through the water and attach themselves to the hull regardless of the angle of incidence. However, once in use, the rod should oscillate relative to the attaching means at very low velocities, corresponding to a slow sinking rate.

The apparatus of FIGS. 1–3 is stored and dispersed in the configuration of FIGS. 1 and 2 and is used in the configuration of FIG. 3. The compact, rigid unit with the major axis of the elliptical rod parallel to the attaching surface of the magnet provides minimum resistance while dropping through the water regardless of orientation of the unit. A roll bar in the form of a projecting portion 40 on the plate member 23 provides a substantially continuous arcuate periphery for the unit except for the flat attaching surface of the magnet. Hence, when the unit lands on a surface, it tends to roll until the flat surface of the magnet engages the landing surface, leaving the unit attached as seen in FIG. 3. A variety of configurations may be used for the magnet and/or case. The case should provide for weather vaning and rolling to bring the attaching surface into contact with the hull or deck with the rod in the downstream direction. It is preferred that the rod be retained in its stored position until rolling and weather vanning are complete and the magnet is firmly attached, reducing the likelihood of fouling or losing contact with the vessel. The coupling cables 31, 32 are connected to the elliptical rod along the minor axis so that the major axis is normal to the hull during hammering, presenting a larger cross section to the moving water.

In use, a plurality of the units of FIG. 1 would be dispersed in the area following initial contact with a potential target. The units could be dropped from an aircraft or a surface vessel by suitable means. The units can also be dispersed over a wide area by means of projectiles and a preferred form of mortar shell for accomplishing this action is shown in FIGS. 4, 5 and 6. This projectile is especially adapted for use with the hedgehog type of launcher. The payload end of the projectile is shown in FIG. 4, the remainder being conventional in design. The body 41 terminates in a hollow shaft 42. Six of the units of FIG. 1 are attached to the exterior of the shaft in tiers of opposing pairs, the units being held in place by the magnets thereof contacting flat spots 43 provided on the shaft, as best seen in FIG. 6.

Means for detaching the units from the shaft and projecting the units away from the projectile are carried in the shaft. In the form of FIGS. 4, 5 and 6, a transverse tube 44 is positioned between each opposing pair of units. An actuator rod 45 is positioned in the center of the shaft 42 and passes through each of the transverse tubes 44. An ejector pin 46 is provided for each unit, with one end of the pin engaging the case 21 and the other end engaging an annular groove 47 in the rod 45. An ejector spring 48 is positioned about each pin, with one end of the spring engaging the pin and the other end engaging a bushing 49 which in turn engages the rod 45.

A compression spring 52 is positioned around the inner end of the rod 45 with one of the spring bearing against the body 41 of the projectile and the other end engaging a washer 53 fixed to the rod. The rod is held in position in the shaft by a cap 54 which also retains separable housing elements 55, 56 in place. The cap 54 may be displaced by any conventional type of fuse element and is shown herein as actuated by a rotating vane 57 which releases the cap at a predetermined time after the projectile is launched.

When the cap 54 is released, the housing elements 55, 56 fall away and the spring 52 moves the rod 45 through the shaft 42. Movement of the rod 45 forces each of the pins 46 outward to detach the units from the shaft. As soon as the grip of the magnet on the shaft is broken, the corresponding spring 48 expands to project the unit from the shaft, resulting in a dispersal of the six units over an area.

An alternative form of the invention is shown in FIGS. 7, 8 and 9, with the unit in the storage configuration in FIG. 7 and in the working configuration in FIG. 8. A magnet 60 serves to attach the unit to the hull 61. A cup member 62 is mounted on the magnet by a rivet 63 and washer 64 which permits the cup member to pivot about the rivet relative to the magnet. A rod 65 is mounted on a shaft 66 which in turn is mounted on a bracket 67 carried by the cup member 62. A pin 68 permits the rod to pivot relative to the shaft and another pin 69 permits the shaft to pivot relative to the cup member. The rod end of the shaft 66 is bent to an oblique angle and passes through a slot 70 in the rod, permitting the rod and shaft to be moved to a substantially parallel position as seen in FIG. 7 with one end of the rod resting on the cup member 62. This provides a compact configuration for storage and dropping through the water. On attachment to a hull, the lateral water forces will cause the rod to be displaced from the cup member and a spring 71 engaging the shaft 66 and an end of the rod 65 may be used to move the rod to a position normal to the shaft as seen in FIG. 8. Alternatively a release pin actuated by contact with the hull could free the rod from its storage position. The unit is now in position for use in the same manner as the unit of FIG. 1.

A projectile for dispersing eight of the units of FIG. 7 is shown in FIG. 10. In the payload end of the projectile, four of the units rest on a base and are held in place by brackets 76 on the separable housing elements 77, 78. Another four units rest on a base plate 79 and are held in place by similar brackets 76. The housing elements 77, 78 may be held together at the nose end by any conventional means, here shown as an impact type cap 80. On impact of the projectile with the water or a hull or other solid object, the housing elements are released and the units fall free of the projectile.

A simpler form of the invention is shown in FIGS. 11, 12 and 13. The unit includes a magnet 84 for attachment to the hull 85 and a yoke 86 mounted on the magnet by a rivet 87 and washer 88. A tubular rod 89 is carried at one end of a bail 90, the other end of the bail being pivotally mounted in the yoke 86. In FIG. 12, the pivot axis of the bail 90 in the yoke 86 is closer to the hull 85 than is the center of the rod 89 when contacting the hull. The angle between the bail and hull at contact is indicated at 95. While this angle may vary over a wide range, it has been found that optimum performance is obtained when the angle 95 is in the range of about 5° to 15°.

A plurality of the units may be stored in a boxlike container 91 having an open bottom, as shown in FIG. 11. A series of vertical plates 92 may be provided within the container for receiving individual units between adjacent plates. A flexible cable 93 is threaded through each of the plates over pulleys 94, 95 with the rods of the respective units resting on the cable. The units may be discharged seriatim by winding the cable onto a remotely positioned reel 96, with the units falling through the open bottom of the container as the cable is withdrawn. This arrangement for dispensing the units is particularly suited for use with a moving vessel or aircraft to spread the units over the area traversed by the vehicle.

Conventional sonar systems will provide a continuous indication of azimuth and range of a submarine. After a period of time, particularly if the submarine is moving at a relatively high speed, its velocity may also be determined. However, when the submarine is moving at a relatively low speed, velocity measurements are extremely difficult and require relatively long periods of time. The present invention is particularly adapted for operation at velocities in the order of one to fifteen knots and will provide an oscillating sound signal having a hammering frequency which varies directly as a function of velocity. Hence, the listening system can be utilized to provide continuous readings of both position and velocity even at very slow speeds, rsulting in a marked improvement in the ability to track submarines during evasive maneuvers and to predict the future positions thereof.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In an apparatus for tracking submarines or the like, the combination of:
   attaching means for attaching the apparatus to a hull at an attaching surface;
   a rod;
   and coupling means for connecting said rod to said attaching means, with said rod movable toward and away from the hull by water flow thereby to impact on the hull in an oscillatory motion as a function of the movement of the apparatus through the water.

2. In an apparatus for tracking submarines or the like, the combination of:
   a magnet for attaching the apparatus to a hull at an attaching surface for travel with the submarine;
   a rod;
   and coupling means for connecting said rod to said magnet, with said coupling means and rod movable relative to said magnet about a pivot axis normal to said attaching surface, and with the axis of said rod normal to a radius from said pivot axis and in a plane parallel to the plane of said attaching surface permitting oscillatory contact of said rod with the hull resulting from water flow past said rod produced by movement through the water of the submarine carrying the apparatus.

3. In an apparatus for tracking submarines or the like, the combination of:
   attaching means for attaching the apparatus to a hull at an attaching surface;
   a rod;
   coupling means for connecting said rod to said attaching means;
   clamp means for maintaining said rod in a fixed position;
   and release means for releasing said clamp means when the apparatus is attached to a hull permitting oscillatory contact of said rod with the hull resulting from movement of the apparatus through the water.

4. In an apparatus for tracking submarines or the like, the combination of:
   attaching means for attaching the apparatus to a hull at an attaching surface;
   a rod having a cross section wtih a major axis and a minor axis;
   coupling means for connecting said rod to said attaching means, with said major axis disposed normal to said attaching surface, and with said coupling means and rod movable about a pivot axis normal to said attaching surface;
   clamp means for maintaining said rod in a fixed position, with said major axis in a plane parallel to the plane of said attaching surface;
   and release means for releasing said clamp means when the apparatus is attached to a hull permitting oscillatory contact of said rod with the hull resulting from water flow past said rod produced from movement through the water of the submarine carrying the apparatus.

5. In an apparatus for tracking submarines or the like, the combination of:
   a magnet for attaching the apparatus to a hull at an attaching surface to carry the apparatus along with the submarine;
   a support member pivotally mounted on said magnet for movement about a pivot axis normal to said attaching surface;
   a rod;
   and connecting means for connecting said rod to said support member and permitting movement of said rod toward and away from the hull to impact on said hull as the submarine moves through the water with water flow past said rod generating said movement.

6. In an apparatus for tracking submarines or the like, the combination of:
   a case including
   a magnet for attaching the apparatus to a hull at an attaching surface to carry the apparatus along with the submarine,
   a rod support member carried on said case, and a section carried on said case and projecting outward away from said attaching surface and providing a substantially continuous arcuate periphery except for said attaching surface;
   a rod;
   and connecting means for connecting said rod to said support member and permitting movement of said rod toward and away from the hull.

7. In an apparatus for tracking submarines or the like, the combination of;
   a magnet for attaching the apparatus to a hull at an attaching surface to carry the apparatus along with the submrine;
   a support member pivotally mounted on said magnet for movement about a pivot axis normal to said attaching surface;
   a tubular rod having an elliptical cross section with a major axis and a minor axis;
   a flexible connector for coupling said rod to said support member, with the longitudinal axis of said rod normal to a radius from said pivot axis and in a plane substantially parallel to the plane of said attaching surface, and with said major axis normal to said attaching surface when said connector is under tension;
   clamp means removably fixed to said support member and engaging said rod for holding said rod against said support member with said major axis parallel to said attaching surface;

and means for releasing said clamp means when said magnet attaches the apparatus to a hull.

8. In an apparatus for tracking submarines or the like, the combination of:
a case including
a magnet for attaching the apparatus to a hull at an attaching surface to carry the apparatus along with the submarine;
a rod;
and a shaft coupling said rod to said case with said rod removable relative to said shaft between a storage position and a working position, and with said shaft joined to said case for pivoting about an axis parallel to said attaching surface, with said rod joined to said shaft for pivoting relative to said shaft about an axis normal to said attaching surface and for pivoting relative to said case about an axis parallel to said attaching surface when in said working position, with said rod and shaft positionable substantially parallel to each other when in said storage position.

9. In an apparatus for tracking submarines or the like, the combination of:
a magnet for attaching the apparatus to a hull at an attaching surface to carry the apparatus along with the submarine;
a support member pivotally mounted on said magnet for movement about a pivot axis normal to the attaching surface;
a rod;
a shaft coupling with said rod to said support member with said shaft joined to said support member for pivoting about an axis parallel to said attaching surface for movement of said rod between a storage position and a working position, wtih said rod joined to said shaft for pivoting relative to said shaft about an axis normal to said attaching surface and for pivoting relative to said support member about an axis parallel to said attaching surface when in said working poistion;
and a spring engaging rod and shaft urging said rod to a position normal to said shaft, with said rod and shaft positionable substantially parallel to each other and normal to said attaching surface when in said storage position.

10. In an apparatus for tracking submarines or the like, the combination of:
a magnet adapted to affix the apparatus to a surface to carry the apparatus along with the submarine;
a cap pivotally carried on said magnet for movement about an axis perpendicular to said surface;
a bail pivotally mounted at one end on said cap for movement in a plane perpendicular to said surface;
and a rod carried at the other end of said bail for oscillatory engagement with said surface as the submarine moves through the water.

11. In an apparatus for tracking submarines or the like, the combination of:
a plurality of hydrodynamic oscillator units, each of said units including means for attaching the unit to a hull to carry the unit along with the submarine and means for intermittently engaging the hull as the unit moves through the water providing a sound source at the hull;
an enclosure for receiving said plurality of units, said enclosure including means for retaining each of said units therein;
and means for releasing said units from said enclosure.

12. In an apparatus for tracking submarines or the like, the combination of:
a plurality of hydrodynamic oscillator units, each of said units including means for attaching the unit to a hull to carry the unit along with the submarine and means for intermittently engaging the hull as the unit moves through the water providing a sound source at the hull;
a housing for receiving said plurality of units, said housing having an open bottom;
and a shaft passing through said housing and engaging each of said units for supporting the units therein, said shaft being removable from said housing for dropping each of said units from said housing through said open bottom.

13. In an apparatus for tracking submarines of the like, the combination of:
a plurality of hydrodynamic oscillator units, each of said units including means for attaching the unit to a hull to carry the unit along with the submarine and means for intermittently engaging the hull as the unit moves through the water providing a sound source at the hull;
a projectile including a separable housing for enclosing said pluraltiy of units and supporting said units therein;
and means for separating said housing from said projectile after the projectile is launched to release said units.

14. In an apparatus for tracking submarines or the like, the combination of:
a plurality of hydrodynamic oscillator units, each of said units including means for attaching the unit to a hull to carry the unit along with the submarine and means for intermittently engaging the hull as the unit moves through the water providing a sound source at the hull;
a projectile having a support member with said units attached to said support member by said means for attaching;
and means for releasing said units from said support member.

15. In an apparatus for tracking submarines or the like, the combination of:
a plurality of hydrodynamic oscillator units, each of said units including a magnet for attaching the unit to a hull to carry the unit along with the submarine and means for intermittently engaging the hull as the unit moves through the water providing a sound source at the hull;
a projectile having a tubular shaft with said units attached to said shaft by the magnets thereof;
a plurality of ejector pins carried in said shaft, with a pin positioned for detaching each of said units from the shaft respectively;
an actuator rod carried in said shaft and engageable with each of said pins to detach the corresponding unit;
and means for moving said rod in said shaft after the projectile is launched to engage and force each of said pins outward to detach said units.

16. An apparatus as defined in claim 15 including spring means engaging each of said units to urge the unit outwardly away from said projectile.

17. A self-contained hydrodynamic oscillator unit for tracking a submarine or the like, the unit including in combination:
first means for atttaching the unit to a hull while in the water for carrying the unit along with the submarine;
and second means carried by and movable relative to said first means for intermittently engaging the hull as the unit moves through the water with said second means driven by flow of water thereby to move relative to said first means and generate a hammering noise at the hull.

18. A self-contained hydrodynamic oscillator unit for tracking a submarine or the like, the unit including in combination:
a magnet for attaching the unit to a hull while in the water for carrying the unit along with the submarine;

a metal rod;

and means for connecting said rod to said magnet for intermittent engagement of the rod with the hull as the unit moves through the water with the rod driven by flow of water thereby to generate a hammering noise at the hull.

19. A method of tracking a submarine or the like moving through the water, including the steps of:

attaching an oscillatory hammer to the exterior of the hull so disposed to be actuated by hydrodynamic action on the hammer of water moving thereby to cyclically contact the hull at a rate which is a function of the velocity of the water stream;

and detecting the sound produced by said contacts with the direction providing an indication of the position of the submarine and the frequency of contact providing an indication of the velocity of the submarine.

References Cited

UNITED STATES PATENTS

| | | | |
|---|---|---|---|
| 1,300,062 | 4/1919 | Walker | 340—4 |
| 1,331,800 | 2/1920 | Brewster | 340—2 |
| 1,460,175 | 6/1923 | Rayder | 340—5 |
| 1,984,383 | 12/1934 | Russell | 340—8 |
| 2,353,360 | 7/1944 | Ronning | 340—4 |
| 2,405,990 | 8/1946 | Beechlyn | 340—8 |
| 2,406,111 | 8/1946 | Sheffield | 340—4 |
| 1,326,156 | 12/1919 | Elia. | |
| 2,044,820 | 6/1936 | Turner | 340—12 |

RICHARD A. FARLEY, *Primary Examiner.*